UNITED STATES PATENT OFFICE.

GRANVILLE M. BREINIG, OF NEW MILFORD, CONNECTICUT.

PRODUCTION OF ARTIFICIAL STONE.

SPECIFICATION forming part of Letters Patent No. 505,747, dated September 26, 1893.

Application filed July 27, 1892. Serial No. 441,392. (No specimens.)

*To all whom it may concern:*

Be it known that I, GRANVILLE M. BREINIG, a citizen of the United States of America, residing at New Milford, in the county of Litchfield and State of Connecticut, have invented a new and useful Improvement in the Composition of Matter for the Production of Artificial Stone Suitable for Floors, Sidewalks, Curbstones, Drains, or other Similar Purposes, of which the following is a specification.

My invention relates also to an improved process for making one of the ingredients used in my composition.

The object of my invention is to produce an artificial stone possessing superior qualities and usefulness and great adaptation as a material for floors, sidewalks, curbstones, drains or other similar purposes, admitting of a hard fine surface finish, and possessing great durability and resistance to the action of the elements, dampness, &c.

Hitherto the best material with which to construct curbing, driveways, sidewalks, flooring, drains, &c., was found to be a mixture of Portland cement with builders' sand so called. This composition gave a coarse and rough surface and has not at all times withstood dampness and the action of the weather, and often crumbled away and became worthless from time and action of the elements and weather. Another great difficulty has been to obtain suitable sand or its substitute to mix with the cement. The more silica in the sand used the better the result obtained; and the use of the pure rock gives much better results than the best sand, for the best sand that can be obtained contains decomposed silica, together with impurities of various kinds which have not been of benefit but detrimental, and the grains of sand have not that angular shape which is desirable. The ingredients used in my composition are not subject to such objections and in carrying out my invention I employ the pure quartz rock; crush same by means of a stone crusher, or heavy stone chasers, and then pass the material over a screen so as to remove therefrom any that may be fine enough to go through about a 60 mesh sieve, that is sixty wires to the square inch. The crushed mass is then passed over another sieve to take therefrom any that may not go through a 10 mesh sieve, so that an even clean grade of crushed quartz remains between that of the 10 and 60 size. This crushed quartz is sharp and angular, that is under the microscope as well as the naked eye it will show a needle pointed shape.

For preparing the second ingredients of my composition, I take a quantity of rock quartz place it in a kiln and bring it to an almost white heat, and then draw it off into cars filled with water. This calcines the quartz and causes it to fracture more readily. This calcined quartz treated as before stated is then placed in a tub about seven feet in diameter with a stone lined bottom, on top of which revolve two large stone chasers weighing about five tons each. These chasers run over the stone bottom and water is run into the tub. On one side of the tub an opening is made protected by a screen of about 8 mesh, that is eight wires to the square inch, or iron sluice bars are used instead. The material is shoveled into this tub and in under these chasers as they revolve continuously. Water is also allowed to flow into this tub continuously, and the material by this process is ground to a certain fineness, and when it gets to that fineness the force of the water carries it through the wire mesh or sluice bars into a wooden pan about six feet square on the outside of this tub. This pan is also connected with a series of other pans so that the water is continually flowing from the tub and over the various pans. That which is in the first pan is of even fineness and about the size of ordinary sand, but it contains no fine dust as that has been carried on by the force of the water to the other pans. This calcined sand in the first pan, or the other pans, forms the second ingredient of my composition.

For the third ingredient of my composition I use cement (Portland preferred.)

In making the artificial stone for pavement, sidewalk, curbing, driveway, drains, &c., I take six parts of the crushed quartz of a size between 10 and 60, and two parts of the calcined quartz, and four parts of cement (Portland preferred.) I then mix them well together dry, adding whatever coloring matter may be desired. This then is wet up with water and thoroughly mixed. This forms my composition as ordinarily used.

For some kinds of work good sand may be substituted in part for each of the above named ingredients with good results, so that less of each of the other ingredients mentioned may be used.

While I have mentioned proportions I do not confine myself to these exact proportions, either as to one article or the other; neither do I confine myself to using any particular size, as that may be varied according to requirement for specific work.

The object of my using a certain proportion of calcined quartz in connection with the uncalcined is that it will assist more readily in forming a thorough combination in time of the lime and aluminum and silica in the cement with that of the uncalcined silica added to same.

Having thus described my invention, what I claim as new is—

An improved composition consisting of crushed quartz, ground calcined quartz, and a hydraulic cement, substantially as set forth.

GRANVILLE M. BREINIG.

Witnesses:
THOS. M. STACK,
HARRY WELLS.